(12) United States Patent
Jia

(10) Patent No.: US 11,688,099 B2
(45) Date of Patent: Jun. 27, 2023

(54) METHOD AND APPARATUS FOR DETECTING OBSTACLE

(71) Applicant: Apollo Intelligent Connectivity (Beijing) Technology Co., Ltd., Beijing (CN)

(72) Inventor: Jinrang Jia, Beijing (CN)

(73) Assignee: Apollo Intelligent Connectivity (Beijing) Technology Co., Ltd., Beijing (CN)

(*) Notice: Subject to any disclaimer, the term of this patent is extended or adjusted under 35 U.S.C. 154(b) by 164 days.

(21) Appl. No.: 17/117,422

(22) Filed: Dec. 10, 2020

(65) Prior Publication Data
US 2021/0366155 A1    Nov. 25, 2021

(30) Foreign Application Priority Data
May 20, 2020    (CN) .......................... 202010429060.0

(51) Int. Cl.
*G06T 3/40*    (2006.01)
*G06T 3/60*    (2006.01)
(Continued)

(52) U.S. Cl.
CPC .............. *G06T 7/74* (2017.01); *G06F 18/214* (2023.01); *G06T 7/37* (2017.01); *G06T 7/80* (2017.01);
(Continued)

(58) Field of Classification Search
None
See application file for complete search history.

(56) References Cited

U.S. PATENT DOCUMENTS

| 2006/0013438 | A1* | 1/2006 | Kubota | G06V 20/58 382/103 |
| 2007/0285579 | A1* | 12/2007 | Hirai | H04N 5/147 348/700 |

(Continued)

FOREIGN PATENT DOCUMENTS

| CN | 103413313 A | 11/2013 |
| CN | 103827921 A | 5/2014 |

(Continued)

OTHER PUBLICATIONS

Chen et al., "Symmetric Phase-Only Matched Filtering of Fourier-Mellin Transforms for Image Registration and Recognition," IEEE Transactions on Pattern Analysis and Machine Intelligence, vol. 16, No. 12, Dec. 1994 (Year: 1994).*

(Continued)

*Primary Examiner* — Soo Shin
(74) *Attorney, Agent, or Firm* — Kilpatrick Townsend & Stockton LLP (57) ABSTRACT

The present disclosure discloses a method and apparatus for detecting an obstacle, and relates to the technical field of intelligent transportation. A specific implementation plan is: acquiring a current image acquired by a camera; inputting the current image into a pre-trained detection model to obtain a position of a detection frame of an obstacle and determine a first pixel coordinate of a grounding point in the current image; determining an offset between the current image and a template image; converting the first pixel coordinate into a world coordinate of the grounding point based on the offset; and outputting the world coordinate of the grounding point as a position of the obstacle in a world coordinate system. This embodiment solves the problem of camera jitter from an image perspective, greatly improves (Continued)

the robustness of the roadside perception system, and saves computing resources.

15 Claims, 5 Drawing Sheets

(51) Int. Cl.
| | | |
|---|---|---|
| *G06T 7/00* | (2017.01) | |
| *G06T 7/33* | (2017.01) | |
| *G06T 7/37* | (2017.01) | |
| *G06T 7/73* | (2017.01) | |
| *G06T 7/80* | (2017.01) | |
| *G06V 10/75* | (2022.01) | |
| *G06V 20/58* | (2022.01) | |
| *G06F 18/214* | (2023.01) | |
| *G06V 10/42* | (2022.01) | |
| *G06V 10/24* | (2022.01) | |
| *G06V 20/56* | (2022.01) | |

(52) U.S. Cl.
CPC ............ *G06V 10/24* (2022.01); *G06V 10/431* (2022.01); *G06V 10/751* (2022.01); *G06V 20/56* (2022.01); *G06V 20/58* (2022.01)

(56) References Cited

U.S. PATENT DOCUMENTS

| | | | | |
|---|---|---|---|---|
| 2012/0140988 A1* | 6/2012 | Takahashi | ............... | G06V 20/58 382/103 |
| 2013/0077891 A1* | 3/2013 | Nimnual | ................... | G06T 7/37 382/276 |
| 2013/0083192 A1* | 4/2013 | Strine | ................ | H04N 5/23267 348/143 |
| 2016/0125266 A1* | 5/2016 | Fujiwara | .............. | G06V 10/754 382/215 |
| 2021/0370912 A1* | 12/2021 | Yamamoto | ............... | B60D 1/00 |

FOREIGN PATENT DOCUMENTS

| | | |
|---|---|---|
| CN | 104596502 A | 5/2015 |
| CN | 108876826 A | 11/2018 |
| CN | 109343061 A | 2/2019 |
| CN | 110738183 A | 1/2020 |
| CN | 110962844 A | 4/2020 |
| JP | 2000-268178 A | 9/2000 |
| JP | 2006-041939 A | 2/2006 |
| JP | 2008-015848 A | 1/2008 |
| JP | 2020-034559 A | 3/2020 |
| JP | 2020-046706 A | 3/2020 |
| WO | 2018/058356 A1 | 4/2018 |

OTHER PUBLICATIONS

Khandelwal, Prateek, et al., "Using Computer Vision to Enhance Safety of Workforce in Manufacturing in a Post Covid World," ARXIV.org, Cornell University Library, 201 Olin Library Cornell Univeristy Ithaca, NY 14853, pp. 1-7, (May 11, 2020).

Anonymous, "Landing AI Creates an AI Tool to Help Customers Monitor Social Distancing in the Workplace," URL: https://landing.ai/landing-ai-creates-an-ai-tool-to-help-customers-monitor-social-distancing-in-the-workplace/, pp. 1-4, (Apr. 16, 2020).

European Search Report dated Sep. 8, 2021 of the corresponding European Patent Application No. 21165055.1 (nine pages).

European Office Action dated Jun. 27, 2022 in related European Application No. 21 165 055.1 (six pages).

Gupta, Divya et al., "A Review on Image Registration," International Journal of Engineering Research & Technology (IJEFT); ISSN: 2278-0181, vol. 3, Issue 2, pp. 2630-2633 (Feb. 2014).

Takahashi, Toru et al., "A Study of Fast Image Matching Method Under translation, Scale and Rotation," Data Science Research Laboratories, NEC Corporation, The Institute of Electronics Information and Communication Engineers, IEICE Technical Report, BioX20; 7-42, PRMU2017-17, (Mar. 18-19, 2018), pp. 37-44.

Bartl, Vojtech, et al., "Dual Optimization for Automatic Camera Calibration by Multi-Target Observations," Brno University of Technology, Brno, Czech Republic, IEEE Xplore, https://ieeexplore.ieee.org/document/8909905, pp. 1-10, (Nov. 25, 2019).

Mu Xingang, Zhou Xiao, "Infrared Detector Imaging and Information Processing," ISBN 978-7-5689-0137-6, pp. 177-180 (Sep. 2016), Chongqing University Press, Chongqing, China.

Li, Li et al., "Road Edge and Obstacle Detection on the SmartGuard Navigation System," Proceedings of the 2014 3rd International Conference on Applied Robotics for the Power Industry, Foz do Iguassu, pp. 1-4, doi: 10.1109/CARPI.2014.7030037 (2014).

* cited by examiner

METHOD AND APPARATUS FOR DETECTING OBSTACLE

CROSS-REFERENCE TO RELATED APPLICATIONS

This application claims priority to Chinese Patent Application No. 202010429060.0, filed with the China National Intellectual Property Administration (CNIPA) on May 20, 2020, the contents of which are incorporated herein by reference in their entirety.

TECHNICAL FIELD

Embodiments of the present disclosure relate to the field of computer technology, specifically to the technical field of intelligent transportation.

BACKGROUND

Roadside perception technology is a technology that send the information on sensed obstacles to vehicles using roadside sensors and perception algorithms, so as to help the vehicles to realize autonomous driving functions. Currently, roadside perception sensors include cameras, lidars, and the like. In a V2X (vehicle to everything, information exchange between the vehicle and the outside world) roadside perception scenario, in order to acquire road traffic information beyond visual range using a camera, the camera position is usually installed on a street light pole or a traffic light pole. The higher the position of the camera is, the larger the field-of-view obtained in an image is, which in turn will get more information and a stronger roadside perception ability. However, when the camera is installed on a tall pole, the camera jitters due to wind blowing or heavy vehicles passing by. When the camera position changes, using external parameters calibrated by the camera offline to perform 3D return of the obstacle may introduce jitter errors. When the jitter is excessive, the external parameters may be invalid, and the position of the obstacle may be seriously inaccurate. Therefore, a robust and stable roadside perception system is desirable to solve the problem of camera jitter.

A conventional roadside perception algorithm framework usually uses offline external parameters. However, when the camera jitters, using offline external parameters may cause the external parameters invalid.

General methods for solving camera jitter include optical image stabilization, mechanical image stabilization, and electronic image stabilization. Due to the cost limitation of roadside perception, the optical image stabilization and the mechanical image stabilization that require additional costs cannot be used on a large scale. However, the ordinary electronic image stabilization may also have large errors when it is applied to the roadside camera, and have problems such as violently moving foreground occlusion, or unrobust feature point extraction.

A popular method is to perform online calibration of external parameters, and update the offline external parameters by calculating the camera's external parameters in real time, so as to the invalidation of offline external parameter in the roadside perception system. This method may achieve an accuracy and real-time performance if it runs on good hardware, which however is computationally expensive and costly.

SUMMARY

A method, apparatus, device and storage medium for detecting an obstacle are provided.

In a first aspect, some embodiments of the present disclosure provide a method for detecting an obstacle, the method comprising: acquiring a current image acquired by a camera; inputting the current image into a pre-trained detection model to obtain a position of a detection frame of an obstacle and determine a first pixel coordinate of a grounding point in the current image, the grounding point being a point on the detection frame close to a camera side; determining an offset between the current image and a template image, the template image being an image used when performing external parameter calibration on the camera; converting the first pixel coordinate into a world coordinate of the grounding point based on the offset; and outputting the world coordinate of the grounding point as a position of the obstacle in a world coordinate system.

In a second aspect, some embodiments of the present disclosure provide an electronic device, comprising: at least one processor; and a memory, communicatively connected to the at least one processor; wherein, the memory, storing instructions executable by the at least one processor, the instructions, when executed by the at least one processor, cause the at least one processor to perform the method according to the first aspect.

In a third aspect, some embodiments of the present disclosure provide A non-transitory computer readable storage medium, storing computer instructions, the computer instructions, being used to cause the computer to perform the method according to the first aspect.

According to the technology of the present disclosure, the problem of camera jitter is solved from an image perspective, so that the robustness of the roadside perception system is greatly improved, and it may face scenarios with camera jitter. In addition, there is no need to add any additional new sensor. At the same time, compared with online calibration algorithms, the method saves costs, and may save the computing resources originally spent on online calibration, to support other applications and calculations.

It should be understood that the content described herein is not intended to identify the key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to the present disclosure, in which.

DETAILED DESCRIPTION OF EMBODIMENTS

Exemplary embodiments of present disclosure are described below with reference to the accompanying drawings, which include various details of the embodiments of the present disclosure to facilitate understanding, and should be considered as merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description.

Figure 1:
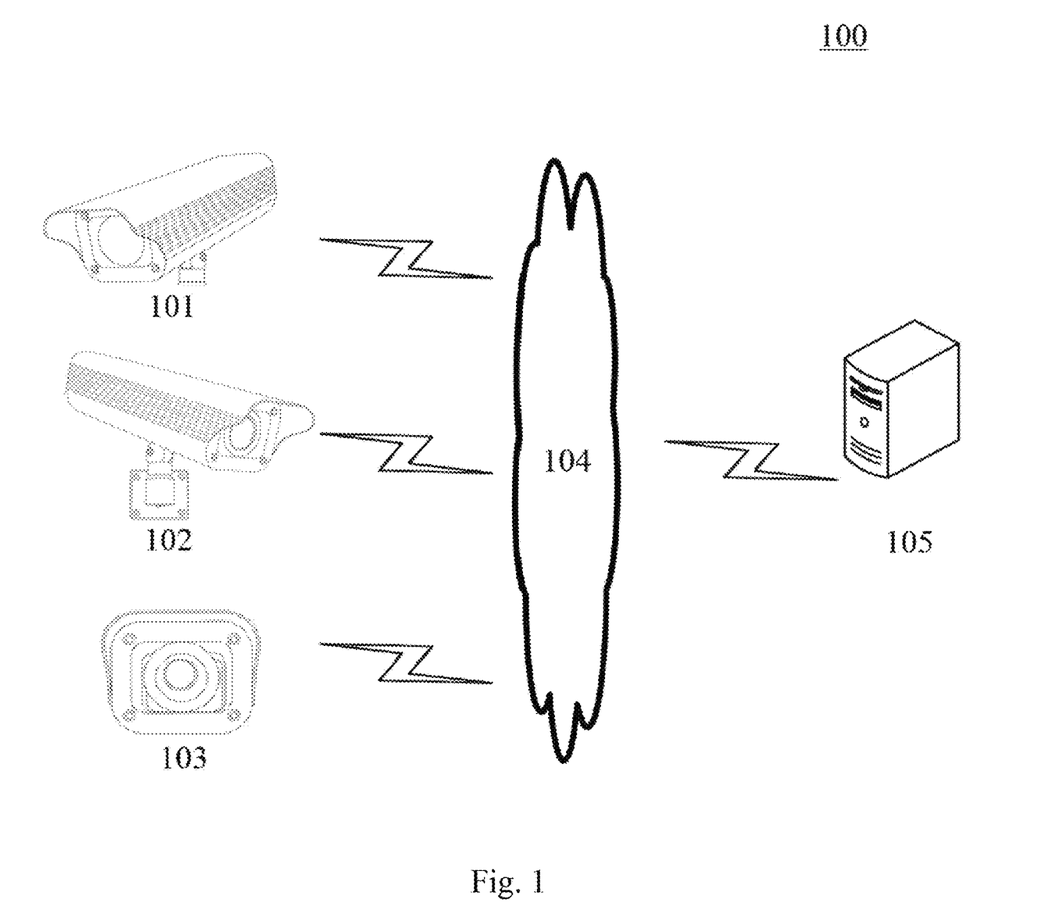
FIG. 1 is a diagram of an exemplary system architecture in which an embodiment of the present disclosure may be implemented.

FIG. 1 illustrates an exemplary system architecture 100 of an embodiment of a method for detecting an obstacle or an apparatus for detecting an obstacle in which the present disclosure may be implemented.

As shown in FIG. 1, the system architecture 100 may include cameras 101, 102, 103, a network 104, and a server 105. The network 104 is used to provide a communication link medium between the cameras 101, 102, 103 and the server 105. The network 104 may include various types of connections, such as wired, wireless communication links, or optic fibers.

A user may use the cameras 101, 102, 103 to interact with the server 105 through the network 104 to receive or send messages, and so on.

The cameras 101, 102, and 103 generally refer to cameras that are used to take pictures and may recognize obstacles. They may be electronic policemen that capture illegal (for example, crossing the lane compaction line, driving in reverse direction, occupying a non-motor vehicle lane, driving against a guide sign, running the red light, etc.) vehicles at intersections. They may also be bayonet cameras installed on some key sections of expressways, provincial highways and national highways to capture illegal acts of speeding. The cameras 101, 102, 103 may also be illegal stop capture cameras, traffic monitoring cameras, skynet monitoring cameras, mobile capture cameras, and the like. They may also be cameras used to assist autonomous driving of unmanned vehicles.

The cameras are installed on the roadside and may jitter due to wind blowing or other reasons. As a result, calibrated external parameters of the cameras are not accurate. The purpose of the present disclosure is to solve the problem of inaccurate obstacle detection caused by camera jitter.

The server 105 may be a server that provides various services, such as a backend analysis server that provides analysis to obstacle data acquired on the cameras 101, 102, 103. The backend analysis server may process such as analyze the received obstacle data, and send a processing result (such as the position of the obstacle) to an unmanned vehicle.

It should be noted that the server may be hardware or software. When the server is hardware, it may be implemented as a distributed server cluster composed of a plurality of servers, or as a single server. When the server is software, it may be implemented as a plurality of software or software modules (for example, a plurality of software or software modules for providing distributed services) or as a single software or software module, which is not specifically limited herein.

It should be noted that the method for detecting an obstacle provided by the embodiments of the present disclosure is generally performed by the server 105. Accordingly, the apparatus for detecting an obstacle is generally provided in the server 105.

It should be understood that the number of cameras, networks and servers in FIG. 1 is merely illustrative. Depending on the implementation needs, there may be any number of cameras, networks and servers.

Figure 2:
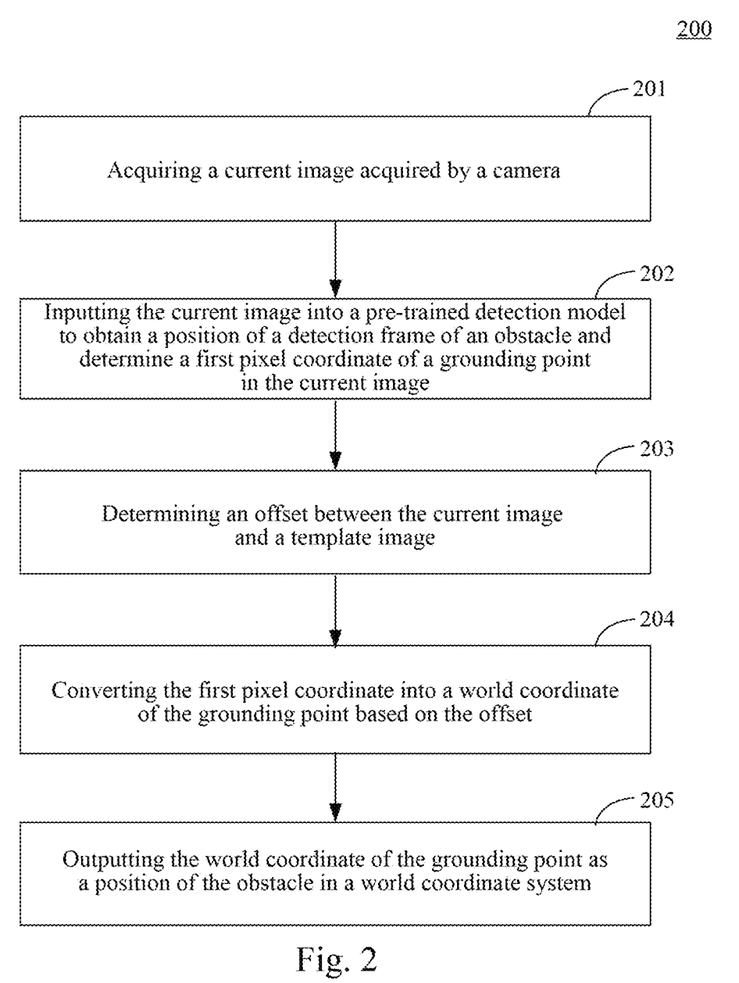
FIG. 2 is a flowchart of an embodiment of a method for detecting an obstacle according to the present disclosure.

With further reference to FIG. 2, a flow 200 of an embodiment of a method for detecting an obstacle according to the present disclosure is illustrated. The method for detecting an obstacle includes the following steps:

Step 201, acquiring a current image acquired by a camera.

In the present embodiment, an executing body of the method for detecting an obstacle (for example, the server shown in FIG. 1) may receive the current image acquired by the camera from camera on the roadside through a wired connection or a wireless connection.

Step 202, inputting the current image into a pre-trained detection model to obtain a position of a detection frame of an obstacle and determine a first pixel coordinate of a grounding point in the current image.

Figure 3:
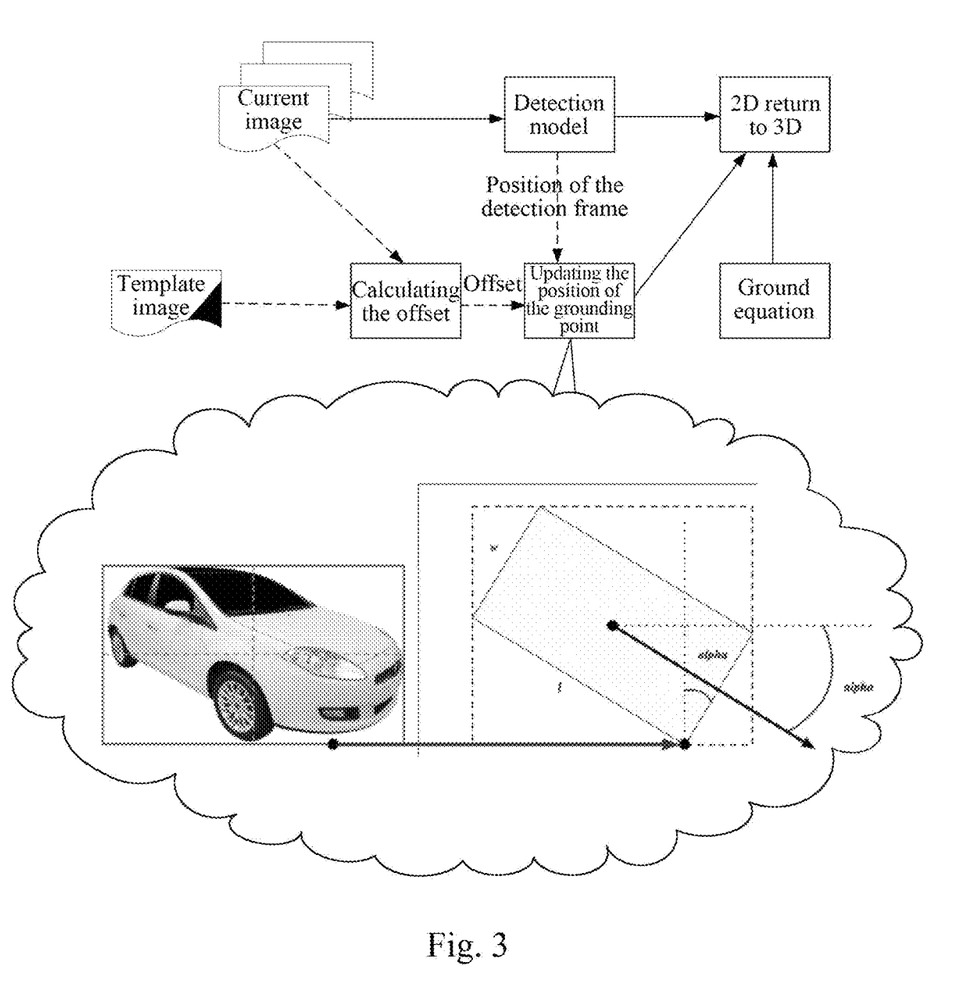
FIG. 3 is a schematic diagram of an application scenario of the method for detecting an obstacle according to the present disclosure.

In the present embodiment, the detection model is a neural network for target detection, such as YOLO ((You Only Look Once, an object recognition and positioning algorithm based on deep neural network), or RCNN (Regions with CNN features, regions with convolutional neural network features). The position of a 2D detection frame of the obstacle may be determined using the detection model. The grounding point is a point on the detection frame close to the camera side. As shown in FIG. 3, the point at the lower-right corner of the vehicle is the grounding point. The first pixel coordinate of the grounding point in the current image may be determined using the detection frame. Alternatively, in order to simplify processing, the grounding point may be set as a corner of the 2D detection frame, such as the upper-left corner or the lower-right corner. In this regard, pixel coordinate is used. A pixel coordinate system refers to a coordinate system of visualized pictures, usually the upper-left corner is the origin, and right and downward is the positive direction.

Step 203, determining an offset between the current image and a template image.

In the present embodiment, the template image is an image used when performing external parameter calibration on the camera. Camera external parameter calibration refers to obtaining a transformation matrix (consisting of rotation matrix and translation vector) from the world coordinate system to the camera coordinate system using a certain method after the camera is installed, and the transformation matrix is the camera external parameter. Camera external parameter is a necessary condition to connect the position of an object in the real world with the pixel position of the object in the image. It is very important in the fields where the position of an object in the image needs to be located, such as autonomous driving and security.

The template image may be used as a reference image, and the current image may be used as an image to be registered. Then, the offset between the current image and the template image is determined using an image registration method. The methods for image registration may include the three types:

(1) Registration method based on gray information of the image to be registered

Based on the gray information of the entire image, a similarity measure between the image to be registered and the reference image is established, and a certain search algorithm is used to find a transform model parameter that makes the similarity measure reach the optimal value. It is also called direct registration method.

(2) Registration method based on information in a transform domain of the image to be registered For example, Fourier transform, phase correlation, Walsh Transform (Walsh transform) and other methods.

Fourier transform can be used in image registration with translation, rotation, and scaling because:

(A) After Fourier transform of two images with translation, their phase relationship is different, because the translation in the time domain directly determines the phase relationship in the Fourier transform domain;

(B) For two images with rotation, the rotation in the Fourier transform domain remains unchanged;

(C) For two images with scale scaling, first coordinate system conversion is performed to transform into the logarithmic coordinate system. The scaling of the images may be converted into image translation for processing.

(3) Registration method based on feature information of the image to be registered The feature-based registration method is currently one of the most commonly used registration methods. The algorithm only needs to extract feature information such as points, lines, and edges in the image to be registered, without other auxiliary information, which reduces the amount of calculation and improves efficiency. At the same time, it can have a certain degree of robustness to the change of image gray.

Based on difference in the selected feature information, the feature-based image registration methods are divided into three categories:

(A) Matching based on feature points

Generally, the selected feature points are pixels having certain singularity relative to their domain. The feature points are often easy to be extracted, but information contained in the feature points is relatively less and can only reflect position coordinate information of the points in the image, so finding matching feature points in the two images is the key.

(B) Matching based on feature regions

Some obvious region information in the images is found as the feature regions.

(C) Matching based on feature edges

The most obvious features in the images are the edges, and the edge feature is also one of the easiest features to extract. Therefore, the matching method given to the edge is very robust and has a wide range of applications.

In some alternative implementations of the present embodiment, the determining an offset between the current image and a template image, includes: calculating a rotation coefficient and a scaling coefficient of the current image to the template image; rotating and scaling the current image based on the rotation coefficient and the scaling coefficient; and calculating the offset of the rotated and scaled current image to the template image. For the image rotation problem, logarithmic polar coordinate transform, Hough transform, wavelet transform and Fourier transform may be used to perform correlation coefficient method registration in the transform domain to calculate the rotation and scaling coefficients of the current image to the template image. Then, the current image is rotated and scaled based on the calculated rotation and scaling coefficients. Then, translation of the rotated and scaled current image to the template image is calculated, which is the offset. The method for calculating translation may be: performing Fourier transform on the rotated and scaled current image, and acquiring a Fourier transform result of the template image; obtaining a normalized cross power spectrum matrix for a Fourier transform result of the current image and the Fourier transform result of the template image; performing inverse Fourier transform on the power spectrum matrix to obtain an H matrix; and finding a point having maximum energy in the H matrix, and calculating an offset of the point. After the Fourier transform, the translation component of the image is converted to the phase, and a maximum matching position of the phase is calculated, then the translation amount of the original image can be obtained, which is the phase correlation. For the scenario of autonomous driving roadside perception, the rotation is greater than the translation in the camera jitter, so it is necessary to calculate the rotation first to eliminate the influence of the rotation, and then further adjust the translation, which can improve the accuracy of calculating the offset, thereby improving the accuracy of obstacle detection.

In some alternative implementations of the present embodiment, the rotation coefficient and the scaling coefficient of the current image to the template image are calculated as the offset, and the translation is no longer calculated. It may choose whether to calculate the translation amount for different application scenarios. For example, for the scenario of autonomous driving roadside perception, the rotation is greater than the translation in the camera jitter, and in some scenarios, it may even be simplified to pure rotation, without calculating the translation, which improves the image registration speed.

Step 204, converting the first pixel coordinate into a world coordinate of the grounding point based on the offset.

In the present embodiment, the first pixel coordinate of the grounding point in the current image may be converted into the second pixel coordinate of the grounding point in the template image based on the offset. Then, the second pixel coordinate is converted into a camera coordinate, and finally the camera coordinate is converted into the world coordinate. The world coordinate system refers to the user-defined three-dimensional world coordinate system, taking a certain point as the origin and is introduced to describe the position of a target object in the real world. The camera coordinate system refers to a coordinate system established with the camera as the origin. It is defined in order to describe the position of the object from the perspective of the camera, as the middle link between the world coordinate system and the pixel coordinate system. The position of the obstacle in the 3D world is also called the position of the obstacle in the world coordinate system. The process of determining the position of the obstacle in the world coordinate system is called the process of returning to 3D.

With only the external camera parameters, the world coordinate of the obstacle cannot be obtained from the pixel coordinate of the obstacle in the image. Because of the lack of depth information, the depth information may be obtained using apparatuses such as lidars and infrared cameras. Conversion from 2D pixel coordinate to 3D pixel coordinate is completed based on the depth information. Then, the internal parameters of the camera are used to complete the conversion from pixel coordinates to camera coordinates. The conversion from pixel coordinates to camera coordinates is an existing technology, so detailed description thereof will be omitted. The process of converting camera coordinates into world coordinates may refer to step 2043 below.

In some alternative implementations of the present embodiment, in the absence of depth information, the conversion from pixel coordinates to world coordinates may be achieved through the following steps:

Step 2041, determining a second pixel coordinate of the grounding point in the template image based on the first pixel coordinate and the offset.

In the present embodiment, based on the offset determined in step 203, the first pixel coordinate of the grounding point in the current image is converted into the second pixel coordinate of the grounding point in the template image.

Step 2042, converting the second pixel coordinate into a camera coordinate of the grounding point using a preset ground equation.

In the present embodiment, in the case where the depth information cannot be provided by other equipment, the ground equation, that is, the ground normal vector, may be used to provide the depth information, and the conversion from 2D pixel coordinates to 3D pixel coordinates may be completed. Then, the internal parameters of the camera are used to complete the conversion from pixel coordinates to camera coordinates. The conversion from pixel coordinates to camera coordinates is an existing technology, so detailed description thereof will be omitted. Due to the high installation height of the roadside camera, the camera may jitter in real time and cause its external parameters to change. Since the ground equation is in the camera coordinate system, it is also necessary to calculate the ground equation in real time. At the same time, because the ground slope may change in the camera scenario, the ground equations at different locations are different. Therefore, in order to improve the accuracy return to 3D, it is necessary to calculate the ground equation in sections instead of using the same ground equation globally. The ground equation may be calculated in the following methods:

(1) Using a global offline ground equation to replace an online by-section ground equation calculated in real time.

(2) Constructing a depth map offline instead of the ground equation. This method may obtain depth information very accurately and calculate the world coordinates of each pixel offline.

(3) An effective method to calculate the ground equation in sections is to divide all the ground 3D points into different grids according to a coordinate range of X and Y. For example, divide the ground captured by the camera into 10*20 Grid, and then calculate the ground equations for different grids. In which grid the grounding point of the obstacle that needs to be returned to 3D falls, the ground equation of the grid is used to return to 3D. The advantage of this method is fast.

The specific calculation method of the ground equation is an existing technology, so detailed description thereof will be omitted.

Step 2043, converting the camera coordinate of the grounding point into the world coordinate of the grounding point using external parameters of the camera.

In the present embodiment, the camera's external parameters include rotation matrix and translation matrix.

The rotation matrix and the translation matrix together describe how to transform a point from the world coordinate system to the camera coordinate system.

The following formula is the process of converting the world coordinate $P_w$ to the camera coordinate $P_c$, R is the rotation matrix, and T is the translation matrix. R and T are external parameters calibrated offline in advance.

$$P_c = \begin{bmatrix} R & T \\ 0 & 1 \end{bmatrix} P_w$$

The conversion of the camera coordinate system to the world coordinate system is an inverse process of the above formula.

$$P_w = \begin{bmatrix} R & T \\ 0 & 1 \end{bmatrix}^{-1} P_c$$

The method provided by the above embodiment of the present disclosure solves the problem of camera jitter from an image perspective, so that the robustness of the roadside perception system is greatly improved, and it may face scenarios with camera jitter. In addition, there is no need to add any additional new sensor. At the same time, compared with online calibration algorithms, the method saves costs, and may save the computing resources originally spent on online calibration, to support other applications and calculations.

Step 205, outputting the world coordinate of the grounding point as a position of the obstacle in a world coordinate system.

In the present embodiment, the return to 3D of the grounding point has completed the return of the obstacle to 3D, so the position of the obstacle in the world coordinate system is obtained. This position is output as the position of the obstacle in the world coordinate system.

With further reference to FIG. 3, FIG. 3 is a schematic diagram of an application scenario of the method for detecting an obstacle according to the present embodiment. In the application scenario of FIG. 3, a camera on the roadside acquires images on the road in real time, and sends the acquired current images to a server. The server inputs the current images into a pre-trained detection model, to obtain the position of the detection frame of an obstacle, and determine a grounding point. The lower-right corner of the vehicle shown is the determined grounding point. The detection frame in the top view has four corners, and the lower-right corner is the closest to the camera, so it is determined as the grounding point. Then, a first pixel coordinate of the grounding point in the current image is determined. An offset between the current image and a template image may be determined by image registration. Based on the offset, it is determined that the grounding point corresponds to a second pixel coordinate in the template image. The second pixel coordinate of the grounding point is converted into camera coordinates using a ground equation. Then, offline calibrated camera external parameters are used to convert the camera coordinates into world coordinates to determine the position of the obstacle.

Figure 4:
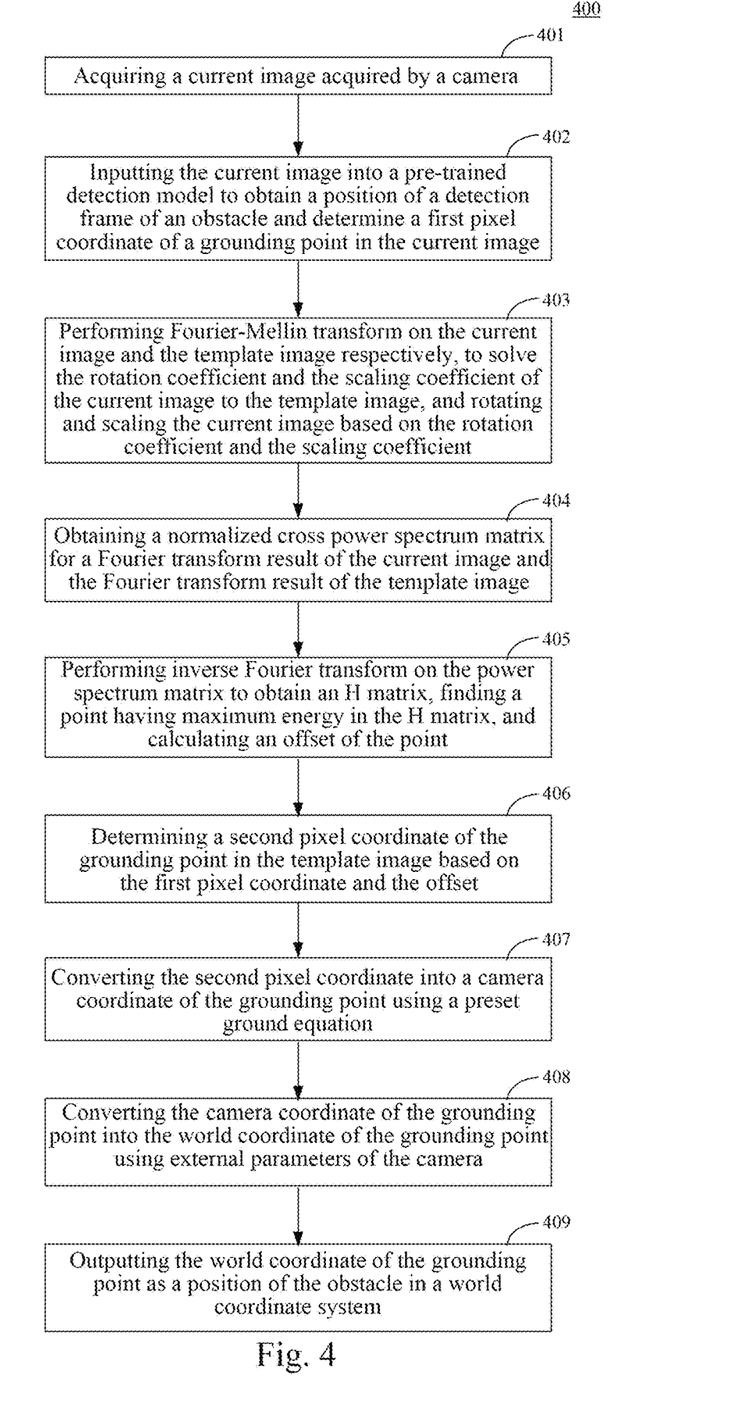
FIG. 4 is a flowchart of another embodiment of the method for detecting an obstacle according to the present disclosure.

With further reference to FIG. 4, a flow 400 of another embodiment of the method for detecting an obstacle according to the present disclosure is illustrated. The method for detecting an obstacle includes the following steps:

Step 401, acquiring a current image acquired by a camera.

Step 402, inputting the current image into a pre-trained detection model to obtain a position of a detection frame of an obstacle and determine a first pixel coordinate of a grounding point in the current image.

Steps 401-402 are basically the same as steps 201-202, so detailed description thereof will be omitted.

Step 403, performing Fourier-Mellin transform on the current image and the template image respectively, to solve the rotation coefficient and the scaling coefficient of the current image to the template image, and rotating and scaling the current image based on the rotation coefficient and the scaling coefficient.

In the present embodiment, Fourier-Mellin transform (Fourier-Mellin) is used to transform the current image and the template image to logarithmic polar coordinates, and solve the rotation coefficient and the scaling coefficient of the current image to the template image. The rotation and scaling in the Cartesian coordinate system are converted into translation in the logarithmic polar coordinate system, and the translation amount is obtained by phase correlation to obtain a scaling ratio and a rotation angle. Corrections are made based on the scaling ratio and the rotation angle, and then the translation amount is directly obtained by phase correlation. Thus, the relative displacement, rotation and scaling of the two images are obtained, which may be used for image registration. Fourier-Mellin transform can improve the image registration speed.

Step 404, obtaining a normalized cross power spectrum matrix for a Fourier transform result of the current image and the Fourier transform result of the template image.

In the present embodiment, Fourier transform is performed on the rotated and scaled current image, and the Fourier transform result of the template image is acquired. After the template image is set, Fourier transform may be performed on it, and the Fourier transform result may be saved for future use. The normalized cross power spectrum matrix is obtained for the Fourier transform result of the current image and the Fourier transform result of the template image.

Step 405, performing inverse Fourier transform on the power spectrum matrix to obtain an H matrix, finding a point having maximum energy in the H matrix, and calculating an offset of the point.

In the present embodiment, inverse Fourier transform is performed on the power spectrum matrix to obtain the H matrix. The point having the maximum energy in the H matrix is found, that is, a registration point, and the offset of this point is calculated. By obtaining the inverse Fourier transform of the cross power spectrum matrix, a Dirac function (pulse function) is obtained, and then the coordinates corresponding to the peak point of the function are found to obtain the registration point required. In fact, in computer processing, the continuous domain should be replaced by the discrete domain, which converts the Dirac function into the form of a sequence of discrete time unit shock functions. In actual calculations, the inverse transform of the phase of the cross power spectrum of the two images always contains a correlation peak representing the registration point of the two images, and some uncorrelated peaks. The correlation peak directly reflects the degree of agreement between the two images. More precisely, energy of the correlation peak corresponds to the percentage of an overlapping area, and the uncorrelated peaks correspond to the percentage of a non-overlapping area. Using this method to calculate the offset may simplify the calculation process and improve the detection efficiency.

Step 406, determining a second pixel coordinate of the grounding point in the template image based on the first pixel coordinate and the offset.

In the present embodiment, based on the position of the frame of a 2D obstacle detection result of the current image, the offset of the previously calculated image is used as the offset of the grounding point of the obstacle, and the position of the grounding point is updated based on this offset, that is, a pixel position of the grounding point of the obstacle in the template image is obtained.

Step 407, converting the second pixel coordinate into a camera coordinate of the grounding point using a preset ground equation.

Step 408, converting the camera coordinate of the grounding point into the world coordinate of the grounding point using external parameters of the camera.

Step 409, outputting the world coordinate of the grounding point as a position of the obstacle in a world coordinate system.

Steps 407-409 are basically the same as steps 204-205, so detailed description thereof will be omitted.

It can be seen from FIG. 4 that, compared with the embodiment corresponding to FIG. 2, the flow 400 of the method for detecting an obstacle in the present embodiment embodies the step of solving the offset by Fourier-Merlin transform. Therefore, the solution described in the present embodiment can accelerate the detection speed and is robust.

Figure 5:
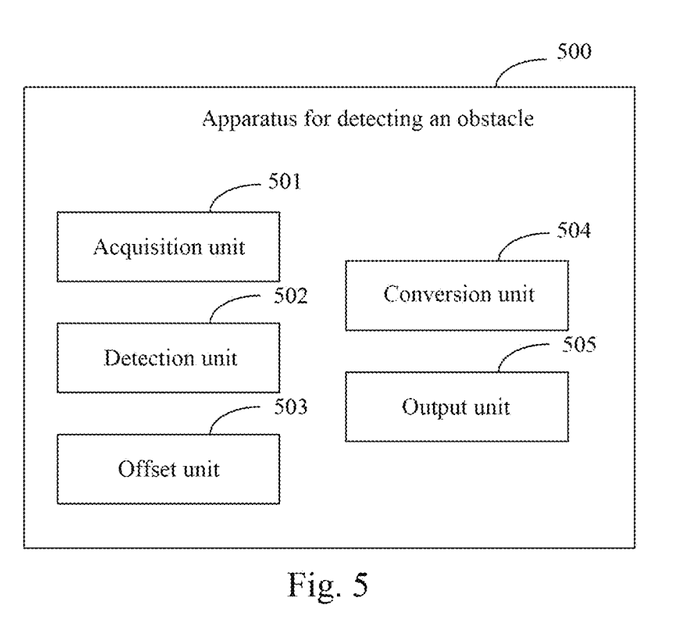
FIG. 5 is a schematic structural diagram of an embodiment of an apparatus for detecting an obstacle according to the present disclosure.

With further reference to FIG. 5, as an implementation of the method shown in the above figures, the present disclosure provides an embodiment of an apparatus for detecting an obstacle, and the apparatus embodiment corresponds to the method embodiment as shown in FIG. 2. The apparatus may be specifically applied to various electronic devices.

As shown in FIG. 5, the apparatus 500 for detecting an obstacle of the present embodiment includes: an acquisition unit 501, a detection unit 502, an offset unit 503, a conversion unit 504 and an output unit 505. The acquisition unit 501 is configured to acquire a current image acquired by a camera. The detection unit 502 is configured to input the current image into a pre-trained detection model to obtain a position of a detection frame of an obstacle and determine a first pixel coordinate of a grounding point in the current image. The offset unit 503 is configured to determine an offset between the current image and a template image, the template image being an image used when performing external parameter calibration on the camera. The conversion unit 504 is configured to convert the first pixel coordinate into a world coordinate of the grounding point based on the offset. The output unit 505 is configured to output the world coordinate of the grounding point as a position of the obstacle in a world coordinate system.

In the present embodiment, the specific processing of the acquisition unit 501, the detection unit 502, the offset unit 503, the conversion unit 504, and the output unit 505 of the apparatus 500 for detecting an obstacle may refer to step 201, step 202, step 203, step 204, and step 205 in the corresponding embodiment in FIG. 2.

In some alternative implementations of the present embodiment, the conversion unit 504 is further configured to: determine a second pixel coordinate of the grounding point in the template image based on the first pixel coordinate and the offset; convert the second pixel coordinate into a camera coordinate of the grounding point using a preset ground equation; and convert the camera coordinate of the grounding point into the world coordinate of the grounding point using external parameters of the camera.

In some alternative implementations of the present embodiment, the offset unit 503 is further configured to: calculate a rotation coefficient and a scaling coefficient of the current image to the template image; rotate and scale the current image based on the rotation coefficient and the scaling coefficient; and calculate the offset of the rotated and scaled current image to the template image.

In some alternative implementations of the present embodiment, the offset unit 503 is further configured to: calculate a rotation coefficient and a scaling coefficient of the current image to the template image; and the determining a second pixel coordinate of the grounding point in the template image based on the first pixel coordinate and the offset, includes: multiplying the first pixel coordinate by the rotation coefficient and the scaling coefficient to obtain the second pixel coordinate of the grounding point in the template image.

In some alternative implementations of the present embodiment, the offset unit 503 is further configured to: perform Fourier-Mellin transform on the current image and the template image respectively, to solve the rotation coefficient and the scaling coefficient of the current image to the template image.

In some alternative implementations of the present embodiment, the offset unit 503 is further configured to: perform Fourier transform on the rotated and scaled current image, and acquire a Fourier transform result of the template image; obtain a normalized cross power spectrum matrix for a Fourier transform result of the current image and the Fourier transform result of the template image; perform inverse Fourier transform on the power spectrum matrix to obtain an H matrix; and find a point having maximum energy in the H matrix, and calculate an offset of the point.

According to an embodiment of the present disclosure, the present disclosure also provides an electronic device and a readable storage medium.

Figure 6:
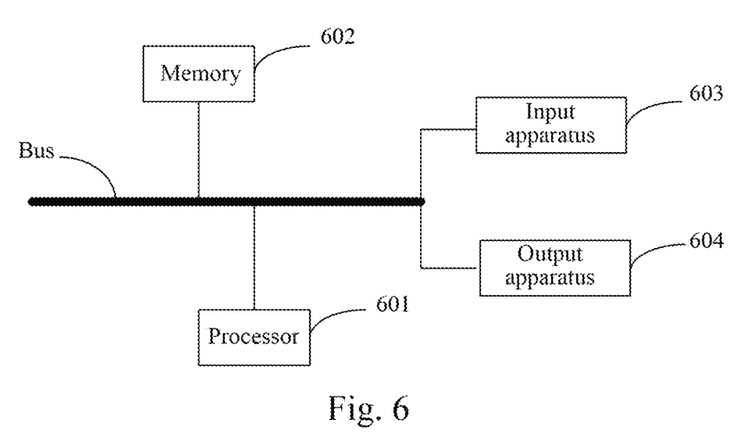
FIG. 6 is a block diagram of an electronic device used to implement the method for detecting an obstacle according to the embodiments of the present disclosure.

As shown in FIG. 6, is a block diagram of an electronic device of the method for detecting an obstacle according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 6, one processor 601 is used as an example.

The memory 602 is a non-transitory computer readable storage medium provided by the present disclosure. The memory stores instructions executable by at least one processor, so that the at least one processor performs the method for detecting an obstacle provided by the present disclosure. The non-transitory computer readable storage medium of the present disclosure stores computer instructions for causing a computer to perform the method for detecting an obstacle provided by the present disclosure.

The memory 602, as a non-transitory computer readable storage medium, may be used to store non-transitory software programs, non-transitory computer executable programs and modules, such as program instructions/modules corresponding to the method for detecting an obstacle in the embodiments of the present disclosure (for example, the acquisition unit 501, the detection unit 502, the offset unit 503, the conversion unit 504, and the output unit 505 as shown in FIG. 5). The processor 601 executes the non-transitory software programs, instructions, and modules stored in the memory 602 to execute various functional applications and data processing of the server, that is, to implement the method for detecting an obstacle in the foregoing method embodiments.

The memory 602 may include a storage program area and a storage data area, where the storage program area may store an operating system and at least one function required application program; and the storage data area may store data created by the use of the electronic device for detecting an obstacle. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device for detecting an obstacle through a network. Examples of the above network include but are not limited to the Internet, intranet, local area network, mobile communication network, and combinations thereof.

The electronic device of the method for detecting an obstacle may further include: an input apparatus 603 and an output apparatus 604. The processor 601, the memory 602, the input apparatus 603, and the output apparatus 604 may be connected through a bus or in other methods. In FIG. 6, connection through the bus is used as an example.

The input apparatus 603 may receive input digital or character information, and generate key signal inputs related to user settings and function control of the electronic device for detecting an obstacle, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technology of the present disclosure, the problem of camera jitter is solved from an image perspective, so that the robustness of the roadside perception system is greatly improved, and it may face scenarios with camera jitter. In addition, there is no need to add any additional new sensor. At the same time, compared with online calibration algorithms, the method saves costs, and may save the computing resources originally spent on online calibration, to support other applications and calculations.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for detecting an obstacle, comprising:
acquiring a current image captured by a camera;
inputting the current image into a pre-trained detection model to obtain a position of a detection frame of the obstacle and determine a first pixel coordinate of a grounding point in the current image, the grounding point being a point on the detection frame belonging to the detected obstacle;
calculating a rotation coefficient and a scaling coefficient of the current image to a template image, the template image being an image used when performing external parameter calibration on the camera;
rotating and scaling the current image based on the rotation coefficient and the scaling coefficient;
performing Fourier transform on the rotated and scaled current image, and acquiring a Fourier transform result of the template image;
obtaining a normalized cross power spectrum matrix for a Fourier transform result of the current image and the Fourier transform result of the template image;
performing inverse Fourier transform on the power spectrum matrix to obtain a first matrix;
finding a point having maximum energy in the first matrix, and calculating an offset of the point based on feature information of points, lines, and edges in the current image;
converting the first pixel coordinate into a world coordinate of the grounding point based on the offset; and
outputting the world coordinate of the grounding point as a position of the obstacle in a world coordinate system.

2. The method according to claim 1, wherein the converting comprises:
determining a second pixel coordinate of the grounding point in the template image based on the first pixel coordinate and the offset;
converting the second pixel coordinate into a camera coordinate of the grounding point by using a preset ground equation; and
converting the camera coordinate of the grounding point into the world coordinate of the grounding point by using external parameters of the camera.

3. The method according to claim 2, wherein the determining the offset between the current image and the template image comprises:
and
wherein the determining of the second pixel coordinate of the grounding point in the template image based on the first pixel coordinate and the offset, comprises:
multiplying the first pixel coordinate by the rotation coefficient and the scaling coefficient to obtain the second pixel coordinate of the grounding point in the template image.

4. The method according to claim 3, wherein the calculating of the rotation coefficient and the scaling coefficient of the current image to the template image comprises:
performing a Fourier-Mellin transform on the current image and the template image respectively, to solve the rotation coefficient and the scaling coefficient of the current image to the template image.

5. The method according to claim 1, wherein the calculating of the rotation coefficient and the scaling coefficient of the current image to the template image comprises:

performing a Fourier-Mellin transform on the current image and the template image respectively, to solve the rotation coefficient and the scaling coefficient of the current image to the template image.

6. An electronic device, comprising:
at least one processor; and
a memory, communicatively connected to the at least one processor and storing instructions executable by the at least one processor to perform an operation for detecting an obstacle, the operation comprising:
acquiring a current image acquired by a camera;
inputting the current image into a pre-trained detection model to obtain a position of a detection frame of the obstacle and determine a first pixel coordinate of a grounding point in the current image, the grounding point being a point on the detection frame belonging to the detected obstacle;
calculating a rotation coefficient and a scaling coefficient of the current image to a template image, the template image being an image used when performing external parameter calibration on the camera;
rotating and scaling the current image based on the rotation coefficient and the scaling coefficient;
performing Fourier transform on the rotated and scaled current image, and acquiring a Fourier transform result of the template image;
obtaining a normalized cross power spectrum matrix for a Fourier transform result of the current image and the Fourier transform result of the template image;
performing inverse Fourier transform on the power spectrum matrix to obtain a first matrix;
finding a point having maximum energy in the first matrix, and calculating an offset of the point based on feature information of points, lines, and edges in the current image;
converting the first pixel coordinate into a world coordinate of the grounding point based on the offset; and
outputting the world coordinate of the grounding point as a position of the obstacle in a world coordinate system.

7. The electronic device according to claim 6, wherein the converting the first pixel coordinate into world coordinate of the grounding point based on the offset, comprises:
determining a second pixel coordinate of the grounding point in the template image based on the first pixel coordinate and the offset;
converting the second pixel coordinate into a camera coordinate of the grounding point using a preset ground equation; and
converting the camera coordinate of the grounding point into the world coordinate of the grounding point using external parameters of the camera.

8. The electronic device according to claim 7, wherein the determining the offset between the current image and the template image comprises:
and
wherein the determining of the second pixel coordinate of the grounding point in the template image based on the first pixel coordinate and the offset comprises:
multiplying the first pixel coordinate by the rotation coefficient and the scaling coefficient to obtain the second pixel coordinate of the grounding point in the template image.

9. The electronic device according to claim 8, wherein the calculating of the rotation coefficient and the scaling coefficient of the current image to the template image comprises:
performing a Fourier-Mellin transform on the current image and the template image respectively, to solve the rotation coefficient and the scaling coefficient of the current image to the template image.

10. The electronic device according to claim 6, wherein the calculating of the rotation coefficient and the scaling coefficient of the current image to the template image, comprises:
performing a Fourier-Mellin transform on the current image and the template image respectively, to solve the rotation coefficient and the scaling coefficient of the current image to the template image.

11. A non-transitory computer readable storage medium, storing computer instructions executable by a computer to perform an operation for detecting an obstacle, the operation comprising:
acquiring a current image acquired by a camera;
inputting the current image into a pre-trained detection model to obtain a position of a detection frame of the obstacle and determine a first pixel coordinate of a grounding point in the current image, the grounding point being a point on the detection frame belonging to the detected obstacle;
calculating a rotation coefficient and a scaling coefficient of the current image to a template image, the template image being an image used when performing external parameter calibration on the camera;
rotating and scaling the current image based on the rotation coefficient and the scaling coefficient;
performing Fourier transform on the rotated and scaled current image, and acquiring a Fourier transform result of the template image;
obtaining a normalized cross power spectrum matrix for a Fourier transform result of the current image and the Fourier transform result of the template image;
performing inverse Fourier transform on the power spectrum matrix to obtain a first matrix;
finding a point having maximum energy in the first matrix, and calculating an offset of the point based on feature information of points, lines, and edges in the current image;
converting the first pixel coordinate into a world coordinate of the grounding point based on the offset; and
outputting the world coordinate of the grounding point as a position of the obstacle in a world coordinate system.

12. The non-transitory computer readable storage medium according to claim 11, wherein the converting the first pixel coordinate into world coordinate of the grounding point based on the offset comprises:
determining a second pixel coordinate of the grounding point in the template image based on the first pixel coordinate and the offset;
converting the second pixel coordinate into a camera coordinate of the grounding point using a preset ground equation; and
converting the camera coordinate of the grounding point into the world coordinate of the grounding point using external parameters of the camera.

13. The non-transitory computer readable storage medium according to claim 12,
wherein the determining of the second pixel coordinate of the grounding point in the template image based on the first pixel coordinate and the offset comprises:
multiplying the first pixel coordinate by the rotation coefficient and the scaling coefficient to obtain the second pixel coordinate of the grounding point in the template image.

14. The non-transitory computer readable storage medium. according to claim 13, wherein the calculating of the rotation coefficient and the scaling coefficient of the current image to the template image comprises:

performing a Fourier-Mellin transform on the current image and the template image respectively, to solve the rotation coefficient and the scaling coefficient of the current image to the template image.

15. The non-transitory computer readable storage medium according to claim 11, wherein the calculating of the rotation coefficient and the scaling coefficient of the current image to the template image comprises:

performing a Fourier-Mellin transform on the current image and the template image respectively, to solve the rotation coefficient and the scaling coefficient of the current image to the template image.

* * * * *

UNITED STATES PATENT AND TRADEMARK OFFICE
CERTIFICATE OF CORRECTION

PATENT NO. : 11,688,099 B2
APPLICATION NO. : 17/117422
DATED : June 27, 2023
INVENTOR(S) : Jinrang Jia Page 1 of 1

It is certified that error appears in the above-identified patent and that said Letters Patent is hereby corrected as shown below:

In the Claims

In Column 16, Line 67, in Claim 14, delete "medium." and insert -- medium --.

Signed and Sealed this
Fifteenth Day of August, 2023

Katherine Kelly Vidal
Director of the United States Patent and Trademark Office